Patented Mar. 4, 1947

2,417,005

UNITED STATES PATENT OFFICE 2,417,005

PROCESS FOR THE MANUFACTURE OF P - AMINOBENZENE SULFONE - N₁ - ACYL-AMIDES

Henry Martin and Franz Häfliger, Basel, Switzerland, assignors to J. R. Geigy A. G., Basel, Switzerland, a Swiss firm No Drawing. Application April 12, 1944, Serial No. 530,738. In Switzerland April 9, 1943

7 Claims. (Cl. 260—397.7)

It is known that the interaction of acetyl-aminobenzene sulfonic acid chloride with carboxylic acid amides does not succeed (Crossley, J. Am. Chem. Soc. 61, 2950, 1939).

In contradistinction thereto it has now surprisingly been found that the condensation of carboxylic acid amide salts with p-nitro- or p-acylaminobenzene sulfonic acid halides, especially in inert solvents, takes place successfully. As salts coming preferably into question may be mentioned the alkaline and earth-alkaline salts. As carboxylic acid amides are suitable those of the aliphatic, araliphatic, aromatic alicyclic as well as of the heterocyclic series.

The present invention will now be described by way of the following examples, without being limited thereto. The parts are by weight.

Example 1

15 parts of 3:4-dimethyl benzamide of the formula

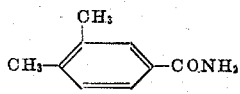

are dissolved in 200 parts of absolute xylol. 4 parts of powdered sodium amide are added and the whole is heated to boiling for half an hour. After cooling a solution of 22 parts of p-nitrobenzene sulfochloride (or of 27 parts of p-nitrobenzene sulfobromide) in 100 parts of absolute xylol is caused to flow thereinto and the mixture is heated under reflux for some time. Then the xylol is distilled off in vacuo, the residue dissolved in a sodium carbonate solution and filtered. By acidification and crystallisation from alcohol 4-nitrobenzene - N - (3':4'-dimethylbenzoyl)-sulfamide melting at 192° C. is obtained. By reduction the corresponding amino derivative is obtained.

In the same manner one obtains from 4-methylbenzamide the 4-aminobenzene-N₁-(4'-methylbenzoyl)-sulfamide melting at 144° C. and from 4-methylmercaptobenzamide the 4 - aminobenzene - N₁-(4'-methylmercaptobenzoyl)-sulfamide melting at 182° C.

Instead of the sodium salt the potassium, calcium or magnesium salt may also be brought to interaction.

Example 2

10 parts of β:β-dimethylacrylic acid amide are dissolved in 200 parts of absolute toluene, treated with 4 parts of sodium amide and heated to boiling for half an hour. After cooling a solution of 22 parts of p-nitrobenzene sulfochloride in 100 parts of absolute toluene is caused to flow thereinto and the whole is heated under reflux and with stirring for 2 hours. The toluene is distilled off in vacuo, the residue is dissolved in a sodium carbonate solution, the solution filtered and acidified. When recrystallised from alcohol, the 4-nitrobenzene-N - (β:β - dimethylacroyl - (sulfamide having the melting point of 155° C. is obtained; by reduction of the latter compound the corresponding amino compound is obtained.

Instead of β:β-dimethylacrylic acid amide also trimethylacrylic acid amide may be used. Thus, 4-aminobenzene - N₁-trimethylacroyl - sulfamide melting at 181°–182° C. is obtained.

In the same manner there can also be obtained from α-propoxy-propionic acid amide (from the acid chloride by means of ammonia) the 4-aminobenzene - N₁-(α-propoxy-propionyl)-sulfamide melting at 140° C. and from α-propoxy-isobutyric acid amide (from bromisobutyric acid ester by means of sodium propylate, subsequent saponification thus giving the acid, transformation of the latter into chloride with thionyl chloride and interaction with ammonia) the 4-aminobenzene-N₁-(α-propoxy-isobutyroyl)-sulfamide melting at 135°–136° C.

Instead of the sodium salt of the said acid amide the potassium, calcium or magnesium salt may be used.

Example 3

10 parts of β:β-dimethylacroylic acid amide are converted into the sodium salt in the manner described in Example 2 and then treated with 23 parts of acetylsulfanilic acid chloride. While stirring the mixture is heated to boiling during 2 hours, whereupon the toluene is blown off by means of steam. The residue is dissolved in a sodium carbonate solution. By filtration, acidification and crystallisation from alcohol one obtains the 4-(N-acetylamino)-N'-β:β-dimethylacroyl sulfamide melting at 233° C.; by saponification of this compound the free amino compound is obtained.

Of course, instead of the acetyl compound there may also be used as starting materials the formyl or propionyl sulfanilic acid chloride.

Example 4

15 parts of 3:4-dimethylbenzamide are dissolved in 200 parts of absolute toluene. Then 2.3 parts of sodium are added thereto and the whole is heated with stirring and under reflux until the sodium has disappeared. After cooling a solution of N-carbethoxy sulfanilic acid chloride (or of the corresponding carbomethoxy compound) in absolute toluene is introduced thereinto and subsequently the mixture is heated to boiling for 2 hours. The toluene is distilled in vacuo, the residue dissolved in diluted caustic soda lye, clarified with animal charcoal and filtered. By acidifying the filtrate, there is obtained, after recrystallisation from alcohol, the 4-(N-carbethoxy aminobenzene) -N'-(3':4'-dimethylbenzoyl)-sulfamide having the melting point of 255° C.; by saponification of this compound the free amino derivative is obtained.

In the same manner there will be obtained from 1-naphthoic acid amide the 4-aminobenzene-$N_1$-(1'-naphthoyl)-sulfamide melting at 206°–207° C. and from 2-naphthoic acid amide the 4-aminobenzene-$N_1$-(2'-naphthoyl)-sulfamide melting at 205° C.

Instead of 3:4-dimethylbenzamide or of $\beta:\beta$-dimethyl acrylic acid amide, amides of other aromatic or aliphatic carboxylic acids or also of araliphatic, hydroaromatic or heterocyclic carboxylic acids may be used.

Example 5

15 parts of hydrocinnamic acid amide are heated in 200 parts of absolute toluene with 4 parts of sodium amide, until any development of ammonia has ceased, and then treated with 23 parts of acetyl sulfanilic acid chloride. The mixture is heated to boiling while stirring for 2 hours and then the toluene is blown off with steam. The residue is dissolved in sodium carbonate, filtered and acidified. By saponification with a 20% caustic soda lye and recrystallisation from diluted alcohol one obtains the 4-aminobenzene-$N_1$- hydrocinnamoyl sulfamide melting at 160°–161° C.

In the same manner there may be obtained from $\alpha$-phenyl cinnamic acid amide the 4-aminobenzene - $N_1$ - ($\alpha$-phenyl cinnamoyl) - sulfamide melting at 211°–212° C., and from 1-methylindene 2-carboxylic acid amide (obtainable from the acid through the acid chloride by means of ammonia) the 4-aminobenzene - $N_1$ - (1'-methylindenoyl)-sulfamide melting at 233° C.

Example 6

11 parts of $\Delta_1$-cyclopentene carboxylic acid amide are heated with 4 parts of sodium amide in 200 parts of absolute toluene, until any development of ammonia has ceased, and then treated with 23 parts of acetyl sulfanilic acid chloride and heated to boiling for 2 hours. The working up is carried out in the manner described in Example 2, thus obtaining the 4-aminobenzene-$N_1$-($\Delta_1$-cyclopentenoyl)-sulfamide melting at 202° C.

In the same manner one obtains from $\Delta_1$-cyclohexenyl-acetic acid amide the 4-aminobenzene-$N_1$-($\Delta_1$-cyclohexenyl acetyl)-sulfamide melting at 176°–177° C., from $\alpha$-furane carboxylic acid amide the 4 - aminobenzene - $N_1$ -($\alpha$-furoyl) - sulfamide melting at 191°–192° C. and from nicotinic acid amide the 4-aminobenzene-$N_1$-(nicotinyl)-sulfamide melting at 256°–257° C.

What we claim is:

1. In the process for the manufacture of p-aminobenzene sulfone-$N_1$-acylamides, the step of reacting a metal salt of a carboxylic acid amide selected from the group consisting of aliphatic, araliphatic, benzene-aromatic, naphthalene-aromatic, alicyclic and heterocyclic carboxylic acid amides containing a metal selected from the group consisting of Na, K and Ca with a benzene sulfonic acid chloride selected from the group consisting of p-nitrobenzene sulfonic acid chloride and p-acylaminobenzene sulfonic acid chloride.

2. In the process for the manufacture of p-aminobenzene sulfone-$N_1$-acylamides, the step of reacting a metal salt of a $\beta:\beta$-dimethylacrylic acid amide containing a metal selected from the group consisting of Na, K and Ca with a benzene sulfonic acid chloride selected from the group consisting of p-nitrobenzene sulfonic acid chloride and p-acylaminobenzene sulfonic acid chloride.

3. In the process for the manufacture of p-aminobenzene sulfone-$N_1$-acylamides, the step of reacting a metal salt of a hydrocinnamic acid amide containing a metal selected from the group consisting of Na, K and Ca with a benzene sulfonic acid chloride selected from the group consisting of p-nitrobenzene sulfonic acid chloride and p-acylaminobenzene sulfonic acid chloride.

4. In the process for the manufacture of p-aminobenzene sulfone-$N_1$-acylamides, the step of reacting a metal salt of a 3:4-dimethylbenzoic acid amide containing a metal selected from the group consisting of Na, K and Ca with a benzene sulfonic acid chloride selected from the group consisting of p-nitrobenzene sulfonic acid chloride and p-acylaminobenzene sulfonic acid chloride.

5. In the process for the manufacture of p-aminobenzene sulfone-$N_1$-acylamides, the step of reacting the sodium salt of $\beta:\beta$-dimethylacrylic acid amide with a benzene sulfonic acid chloride selected from the group consisting of p-nitrobenzene sulfonic acid chloride and p-acylaminobenzene sulfonic acid chloride.

6. In the process for the manufacture of p-aminobenzene sulfone-$N_1$-acylamides, the step of reacting the sodium salt of hydrocinnamic acid amide with a benzene sulfonic acid chloride selected from the group consisting of p-nitrobenzene sulfonic acid chloride and p-acylaminobenzene sulfonic acid chloride.

7. In the process for the manufacture of p-aminobenzene sulfone-$N_1$-acylamides, the step of reacting the sodium salt of 3:4-dimethyl benzoic acid amide with a benzene sulfonic acid chloride selected from the group consisting of p-nitrobenzene sulfonic acid chloride and p-acylamino benzene sulfonic acid chloride.

HENRY MARTIN.
FRANZ HÄFLIGER.

REFERENCES CITED

The following references are of record in the file of this patent:

FOREIGN PATENTS

| Number | Country | Date |
| --- | --- | --- |
| 111,230 | Australian | Aug. 1940 |

OTHER REFERENCES

Crossley et al., Jour. Am. Chem. Soc., vol. 61, pp. 2950–55, 1939.